(12) United States Patent
Gallet

(10) Patent No.: US 8,667,777 B2
(45) Date of Patent: Mar. 11, 2014

(54) BYPASS ENGINE WITH CONTRAROTATING TURBINE WHEELS INCLUDING A REVERSING MODULE

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 1059 days.

(21) Appl. No.: 12/707,145

(22) Filed: Feb. 17, 2010

(65) Prior Publication Data

US 2010/0205934 A1 Aug. 19, 2010

(30) Foreign Application Priority Data

Feb. 18, 2009 (FR) .................................... 09 51061

(51) Int. Cl.
*F02K 3/072* (2006.01)

(52) U.S. Cl.
USPC ........................ 60/268; 60/226.1; 60/39.162

(58) Field of Classification Search
USPC ............... 60/226.1, 226.3, 262, 268, 39.162, 60/39.163, 802
See application file for complete search history.

(56) References Cited

U.S. PATENT DOCUMENTS

| | | | | |
|---|---|---|---|---|
| 3,611,834 A * | 10/1971 | Dison | ............................ | 475/343 |
| 3,729,957 A | 5/1973 | Petrie et al. | | |
| 4,005,575 A | 2/1977 | Scott et al. | | |
| 4,270,408 A * | 6/1981 | Wagner | ............................ | 74/661 |
| 4,651,521 A * | 3/1987 | Ossi | ............................... | 60/226.3 |
| 4,674,276 A * | 6/1987 | Kitaguchi | ................... | 60/39.163 |
| 4,790,133 A * | 12/1988 | Stuart | ........................... | 60/226.1 |
| 4,916,894 A | 4/1990 | Adamson et al. | | |
| 4,936,748 A * | 6/1990 | Adamson et al. | ............. | 416/123 |
| 4,947,642 A * | 8/1990 | Grieb et al. | .................. | 60/226.1 |
| 5,010,729 A | 4/1991 | Adamson et al. | | |
| 5,274,999 A * | 1/1994 | Rohra et al. | .................. | 60/226.1 |
| 6,672,049 B2 * | 1/2004 | Franchet et al. | ............. | 60/226.1 |
| 7,299,621 B2 * | 11/2007 | Bart et al. | ..................... | 60/226.1 |
| 7,386,983 B2 * | 6/2008 | Miller | .............................. | 60/802 |
| 7,412,819 B2 * | 8/2008 | Bart et al. | ..................... | 60/226.1 |
| 7,481,062 B2 * | 1/2009 | Gaines et al. | .................. | 60/792 |
| 7,942,079 B2 * | 5/2011 | Russ | ................................ | 74/664 |
| 8,015,798 B2 * | 9/2011 | Norris et al. | .................... | 60/268 |
| 8,450,888 B2 * | 5/2013 | Shafer et al. | .................... | 310/54 |

(Continued)

FOREIGN PATENT DOCUMENTS

DE 39 33 776 A1 4/1991
EP 1 553 276 A1 7/2005

(Continued)

*Primary Examiner* — Phutthiwat Wongwian
*Assistant Examiner* — Michael B Mantyla
(74) *Attorney, Agent, or Firm* — Oblon, Spivak, McClelland, Maier & Neustadt, L.L.P.

(57) ABSTRACT

A bypass aeronautical engine including a fan, an LP compressor, an HP compressor, a combustion chamber, an HP turbine, and at least one LP turbine stage is disclosed. The LP turbine stage includes a first movable bladed wheel carried by a first turbine shaft and a second movable bladed wheel turning in the opposite direction to the first wheel. The fan is driven by the second wheel via a second turbine shaft and by the first shaft via a module for reversing its direction of rotation. The reversing module includes two bevel pinions carried respectively by the first and second LP turbine shafts, and a reversing pinion.

14 Claims, 3 Drawing Sheets

(56) References Cited

U.S. PATENT DOCUMENTS

| | | | |
|---|---|---|---|
| 2006/0137355 A1* | 6/2006 | Welch et al. | 60/772 |
| 2007/0022735 A1* | 2/2007 | Henry et al. | 60/39.162 |
| 2008/0060341 A1 | 3/2008 | Loisy | |
| 2008/0148881 A1* | 6/2008 | Moniz et al. | 74/15.6 |
| 2008/0317594 A1* | 12/2008 | Servant | 415/229 |
| 2011/0154827 A1* | 6/2011 | Ress et al. | 60/772 |
| 2013/0000317 A1* | 1/2013 | Berryann et al. | 60/778 |

FOREIGN PATENT DOCUMENTS

| | | |
|---|---|---|
| FR | 971 209 | 1/1951 |
| FR | 2 121 524 | 8/1972 |
| FR | 2 641 333 | 7/1990 |
| FR | 2 710 108 | 3/1995 |
| GB | 2 199 375 | 7/1988 |
| GB | 2 226 599 | 7/1990 |

* cited by examiner

BYPASS ENGINE WITH CONTRAROTATING TURBINE WHEELS INCLUDING A REVERSING MODULE

The field of the present invention is that of turbomachines, and in particular turbofans or bypass jet engines, for aeronautics.

BACKGROUND OF THE INVENTION AND DESCRIPTION OF THE PRIOR ART

The designers of aeronautical engines for commercial aircraft are constantly seeking to reduce the mass, the specific consumption of their projects, that is to say the consumption expressed in kg of fuel consumed per kg of created thrust, and the level of noise which they generate in use. To that end, the engine most used at the current time is the turbofan which consists of a twin-spool bypass engine with a high bypass ratio, with a fan of large diameter which is driven directly by the low-pressure turbine.

This configuration has the disadvantage of rotating the fan at the same speed of rotation as the low-pressure turbine. Now, in order to obtain good specific consumptions and a reduced noise level, this fan should be rotated as slowly as possible while adapting the profile of the blades in order to maintain a high air flow rate and speed and hence a desired level of thrust. However, slowing down the speed of rotation of the low-pressure shaft results in a degradation of the operation of the turbine which, itself, by contrast, needs to rotate quickly in order to have a good efficiency and to help achieve a low specific consumption.

A first solution for combining a low speed of rotation of the fan and a high speed of rotation of the LP turbine consists in placing a reduction gear on the shaft which connects these two elements.

The advantages of this architecture are offset by the weight of this additional equipment and the complexity of its development taking account of the power which passes through it.

Also known are patent applications FR 2641333 and GB 2226599 which describe aeronautical engines of which the fan and the turbine can rotate at different speeds without a reduction unit with a high reduction ratio between them. These engines comprise two LP turbine shafts which are driven by contrarotating turbine wheels. The two sets of turbine blades can rotate and are imbricated in one another. A gear device serves to reverse the direction of rotation of one of the shafts in order to drive the fan of the turbomachine. The reversing module consists of two radially staged pinions which do not have the same diameter and therefore which are not driven by shafts rotating at the same speed. One of the two shafts is then mechanically more loaded than the other, something which is unfavorable with respect to the overall mass of the engine.

SUMMARY OF THE INVENTION

The present invention aims to overcome these disadvantages by providing a turbofan engine with two contrarotating low-pressure turbine shafts which does not have some of the disadvantages of the prior art, and in particular wherein the mechanical load on the turbine wheels, for a given aerodynamic load, is as small as possible.

To this end, the subject of the invention is an aeronautical engine comprising a fan, an LP compressor and an HP compressor, a combustion chamber, an HP turbine stage and at least one LP turbine stage, said LP stage comprising a first movable bladed wheel and a second movable bladed wheel, said fan being driven by said second wheel via a second turbine shaft and by said first shaft via a module for reversing its direction of rotation, wherein the reversing module is produced with the aid of two bevel pinions of the same size, carried respectively by the first and second LP turbine shafts, and with the aid of a reversing pinion, the two turbine shafts rotating in absolute value at the same speed of rotation.

Said LP turbine operates like a conventional turbine in which the stator is fixed and in which the speed of rotation of the rotor is equal to the sum of the speeds of rotation of the two movable wheels. However, since the speeds of rotation of these two bladed wheels are small by comparison with that of the rotor of a conventional turbine, there is obtained a high reduction in the mechanical stresses associated with, inter alia, the possibility of reducing the size of the disks which support them. Moreover, with the two shafts rotating, in absolute value, at the same speed of rotation, the sought aerodynamic load for the turbine is obtained with the smallest possible speed of rotation for each of the two shafts. This configuration is thus the one which gives the smallest mechanical load on the turbine wheels for a given aerodynamic load.

According to preferred features:
- the speed reversing module is situated in the vicinity of the fan, below the inlet casing of the low-pressure compressor; it is thus ideally placed to be produced in combination with the power take-off members on the engine;
- a fixed turbine nozzle is positioned upstream of the first movable bladed wheel of the first LP turbine stage;
- the blades of said turbine nozzle are oriented like blades of a turbine rotor and the blades of the movable first wheel are oriented like vanes of a turbine stator;
- the blades of said turbine nozzle are oriented like vanes of a turbine stator and the blades of the second movable wheel are oriented like blades of a turbine rotor;
- the first bladed wheels, and the second, are connected mechanically to one another;
- the two LP turbine shafts each carry a bearing unit between which a ball bearing is arranged;
- the two LP turbine shafts each carry a bearing unit between which a roller bearing is arranged;
- the first bevel pinion is carried by splines of the first LP turbine shaft and by a bearing unit mounted on a ball bearing connected to the structure of the engine;
- the second bevel pinion is carried by splines of the second LP turbine shaft and by a bearing unit mounted on a roller bearing connected to the structure of the engine.

BRIEF DESCRIPTION OF THE DRAWINGS

The invention will be better understood, and other aims, details, features and advantages thereof will become more clearly apparent, in the course of the detailed explanatory description which follows of a number of embodiments of the invention given by way of purely illustrative and nonlimiting examples, with reference to the appended schematic drawings, in which.

DESCRIPTION OF THE PREFERRED EMBODIMENTS

Figure 1:
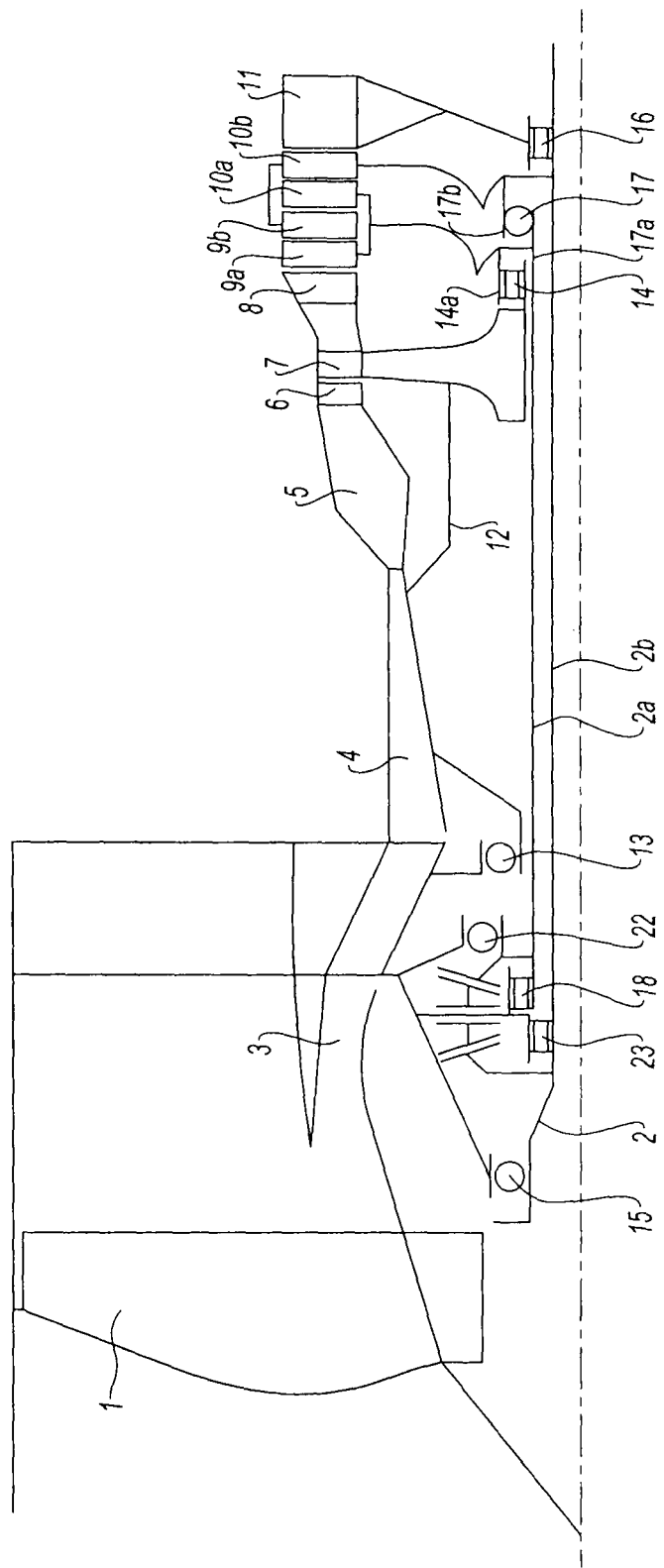
FIG. 1 is a schematic view of a turbofan engine according to a first embodiment of the invention.

Referring to FIG. 1, there can be seen the schematic diagram of a twin-spool turbofan engine comprising a fan 1 carried by the LP shaft 2. The air flow downstream of the fan is divided into two parts: one part, termed secondary air or cold flow, which is sent directly toward the jet pipe of the engine and which participates in the thrust of the engine, and a second part, termed primary air or hot part, which passes through the hot parts of the engine. This primary air passes first of all into the LP compressor 3 (not shown), and then into the HP compressor 4 (not shown), so as to be compressed therein before entering the combustion chamber 5. At the outlet of the combustion chamber, the hot gases are expanded in an HP turbine, consisting of a fixed HP nozzle 6 and of a movable HP turbine wheel 7.

The engine conventionally has an HP turbine shaft 12, which mechanically connects the HP turbine wheel 7 to the HP compressor 4 in order to drive the latter. This HP turbine shaft 12 is mounted on two bearing units connected, in the case of the front bearing unit, to the structure of the engine by a ball bearing 13 in order to take up the thrust forces and, in the case of the rear bearing unit, to a second LP shaft 2a by a roller bearing 14.

At the outlet of the HP turbine, the combustion gases are sent, while passing through a fixed LP nozzle 8, to a two-stage LP turbine and then ejected toward the jet pipe via an exhaust casing 11 carried by the structure of the engine.

Each of the stages of the LP turbine comprises, in the first embodiment, a wheel 9a, 10a, analogous to a stator wheel, called first wheels here, and a wheel analogous to a rotor wheel 9b, 10b, called second wheels here. All these blades are able to rotate, unlike the prior art where the blades of stator type are fixed. The second wheels 9b and 10b of the two stages are conventionally connected to a second turbine shaft 2b, which passes longitudinally through the engine and which forms, at its front end, the LP shaft 2 driving the fan 1. The first wheels 9a and 10a of the two stages are mounted on a first LP turbine shaft 2a, which can rotate like the LP shaft 2b, but in the opposite direction.

The second wheels of the two stages, which are connected to the second turbine shaft 2b, are carried by a bearing unit 17b which co-operates with an LP turbine inter-shaft ball bearing 17, while the first wheels of the two stages are connected to the first turbine shaft 2a and carried by a bearing unit 14a which co-operates with the roller bearing 14 carrying the HP turbine shaft.

The second LP turbine shaft 2b is mounted in a conventional manner on two bearing units connected to the structure of the engine, in the case of the front bearing unit 15b by a ball bearing 15 in order to take up the thrust forces and, in the case of the rear bearing unit 16b, by a roller bearing 16.

With regard to the first LP shaft 2a, it is mounted on two bearing units connected, in the case of the front bearing unit 18a, to the structure of the engine by a roller bearing 18, and, in the case of the rear bearing unit 17a, to the second LP turbine shaft 2b by the inter-shaft ball bearing 17. This ball bearing makes it possible to recover the thrust which is exerted on the first LP turbine shaft 2a and to transmit it via the second LP shaft 2b and its ball bearing 15 to the structure of the engine.

Figure 3:
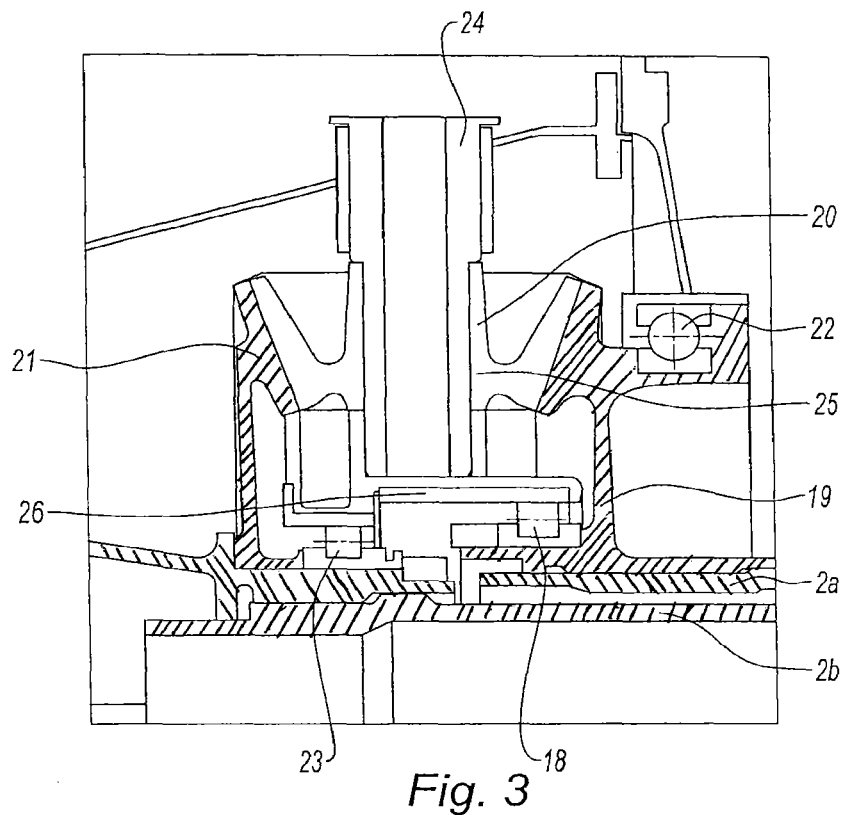
FIG. 3 is a view in section of the module for reversing the direction of rotation of the shafts of the LP turbine in the first embodiment of the invention.
Figure 4:
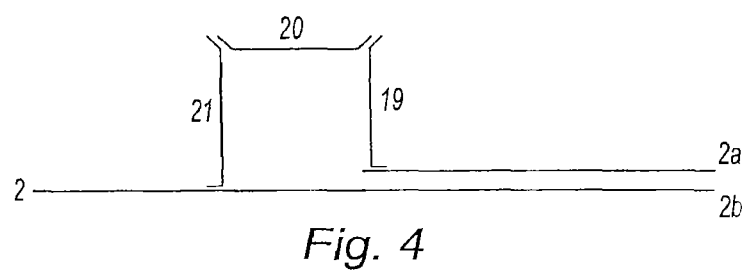
FIGS. 4 and 5 are schematic views of two modules for reversing the direction of rotation according to a first and a second embodiment of this module.

With reference now to FIGS. 1, 3 and 4, there can be seen a device for reversing the direction of rotation of one of the LP turbine shafts, which makes it possible to drive the LP rotor 2 jointly by the two shafts 2a and 2b.

A first bevel pinion 19 is mounted in a longitudinally sliding manner, via splines, on the first LP shaft 2a, this pinion being carried by the splines of the shaft 2a and by a bearing unit mounted on a ball bearing 22 connected to the structure of the engine. This first pinion 19 co-operates with a reversing pinion 20 which rotates freely on a plain bearing 25 carried by a fixed axle 24 connected to the structure of the engine. The reversing pinion co-operates furthermore with a second bevel pinion 21 mounted in a longitudinally sliding manner, via splines, on the second LP shaft 2b. This second bevel pinion 21 is connected to the structure of the engine by a bearing unit mounted on a roller bearing 23. The fixed rings of the ball bearing 22 or roller bearing 23 are carried by a bearing support 26 connected rigidly to the structure of the engine.

The fixed axle 24 also allows the supply of lubricating means for cooling the bevel pinions during their operation.

Figure 2:
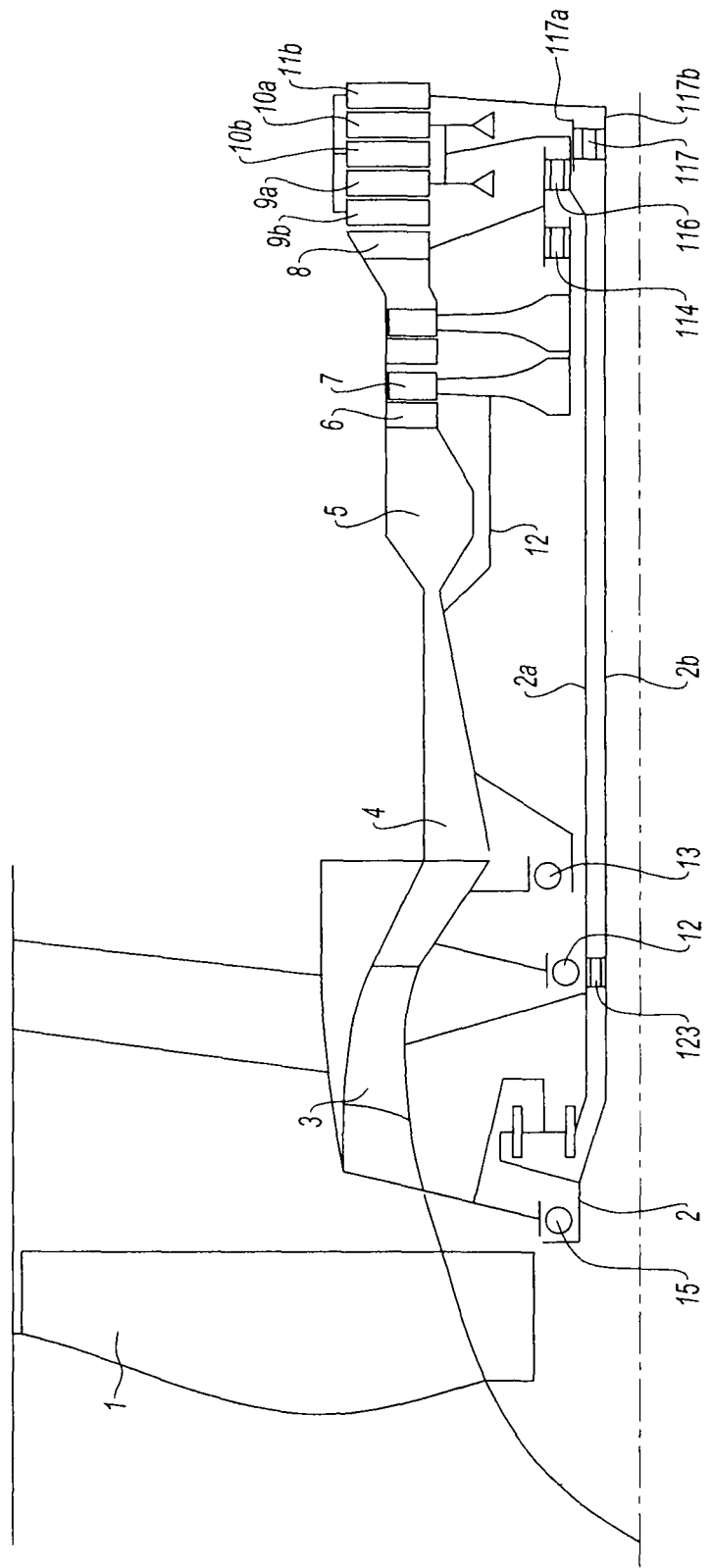
FIG. 2 is a schematic view of a turbofan engine according to a second embodiment of the invention.
Figure 5:
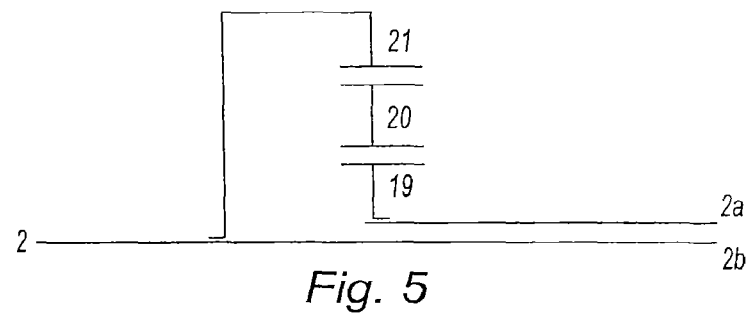

In a variant described schematically by FIG. 5 and illustrated in FIG. 2 with the second embodiment, the reversing module is composed of two spur pinions 19 and 21 which are concentric with the axis of the engine, and which mesh with one or more reversing spur pinions 20. As previously, the first pinion 19 is mounted in a sliding manner on the first LP shaft 2a via splines, while the second pinion 21 is mounted in a sliding manner on the second LP shaft 2b via splines. The reversing pinions 20 turn on shafts kept in place by the structure of the engine. This variant is adapted in the case of an engine in which the two LP turbine shafts 2a and 2b rotate at different speeds.

With reference now to FIG. 2, there can be seen a second embodiment of the invention. The references of the identical parts in the two embodiments are retained; the parts having a function analogous to those of the first embodiment are designated by the same reference, incremented by 100.

The upstream part of the engine, comprising the compressors, the combustion chamber and the high-pressure turbine, remains identical to the first embodiment. At the outlet of the LP turbine nozzle 8, the gases are sent to an LP turbine comprising three movable second bladed wheels 9b, 10b, 11b separated by two bladed first wheels 9a, 10a, the wheels of each type being connected mechanically to one another. The first wheels drive the LP compressor 3 and the fan 1 via the first LP shaft 2a, while the second wheels drive this same compressor 3 and the fan 1 via the second LP shaft 2b with the reversal of its direction of rotation via a reversing module; this reversing pinion is represented here in the version with spur pinions as is illustrated by FIG. 5.

A number of configurations are possible for the orientations of the first and second LP turbine wheels: either the first are oriented as stator wheels and the second as rotor wheels, or vice versa. A person skilled in the art will be able to adapt the orientation of the blades of the movable wheels and that of the LP nozzle 8 so that the LP turbine stages operate suitably.

In the version represented in FIG. 2, the first LP shaft 2a is mounted in a conventional manner on two bearing units connected to the structure of the engine, in the case of the front bearing unit 22a by a ball bearing 22 in order to take up the thrust forces and, in the case of the rear bearing unit 116a, by a roller bearing 116.

The second LP turbine shaft 2b is, for its part, mounted on two bearing units, a ball bearing 15 in the case of the front bearing unit 15b and an inter-turbine roller bearing in the case of the rear bearing unit 117.

A number of other configurations can be envisioned for the mounting of the two LP turbine shafts, since they drive the two sets of blades in opposite directions to one another.

There will now be described the operation of a turbofan according to a first embodiment of the invention and the improvements that it provides over the prior art. The operation in the second embodiment is analogous.

The flow of the gases at the outlet of the HP turbine enters the first LP turbine stage via the LP nozzle 8. This nozzle is produced with the aid of blades which orient the flow in the direction of the first movable blades 9a.

Whereas in a conventional engine the stator of the first turbine stage is fixed, the first wheel 9a of the present engine is movable and, according to the first embodiment of the invention, rotates at a speed of rotation which is equal, but in an opposite direction to that of the second wheel 9b. The flow of the gases at the outlet of the first turbine stage 9a/9b then passes into the first wheel 10a of the second LP stage, which is connected mechanically to the first wheel 9a of the first stage; this wheel therefore rotates also at the same speed of rotation as the wheel 9a and for its part in the opposite direction. The flow of the gases finally passes into the second wheel 10b of the second LP stage, which is for its part connected mechanically to the second wheel 9b of the first stage and which rotates also at the same speed of rotation, in the direct direction. The flow of gases is finally ejected toward the downstream end of the engine and the jet pipe.

Since the first and second wheels rotate in opposite directions, the aerodynamic operation of the stages of the LP turbine is the same as if the first wheels were fixed and as if the second wheels rotated at a speed equal to the sum of the speeds of these two rotors. By way of example taking a fan rotating at $\omega=3500$ rpm, if the two wheels of the same stage 9a and 10a (respectively 9b and 10b) of the contrarotating turbine rotate in opposite directions, at equal speeds $\omega a=\omega b=3500$ rpm, the aerodynamic flow will see the sum of the two speeds $2\omega=7000$ rpm.

The parameter of aerodynamic load of the turbine is, for its part, inversely proportional to the square of the speed of the blades ($4\omega^2$). The aerodynamic load of a contrarotating turbine is, with equivalent dimensions and speeds of rotation, four times smaller than that of a conventional turbine. Thus, with the same aerodynamic load, the use of contrarotating turbines thus makes it possible to drastically reduce the dimensions of the turbine while maintaining very good efficiency.

The present invention has been described, in the first embodiment, while assuming that the speeds of rotation $\omega 1$ and $\omega 2$ are of opposite directions but equal in absolute value. In other embodiments, it is possible to provide speeds in absolute value which are different for the two shafts and to adapt the reduction ratio of the corresponding pinions in the reverse module. FIGS. 4 and 5 give two diagrams showing the principle of a pinion meshing arrangement capable of providing the desired reduction ratio. FIG. 4 again depicts the diagram showing the principle of the reversing module of the first embodiment, with $\omega 1=\omega 2$. In the embodiment illustrated by FIG. 5, there is obtained a reversal of the speed and an acceleration with the speed $\omega 1$ of the shaft 2a greater than that $\omega 2$ of the shaft 2b. It is thus possible, at the design stage, to play around with the relative speeds of the two stages of the LP turbine, without changing the adaptation of the LP compressor and of the fan and optimizing the operation of the bladed wheels.

It is quite clear that this speed difference between the two shafts remains limited and is incomparable with the reduction ratios to be generated, in the prior art, between the speed of the LP turbine and that of the fan.

With regard to mechanical stability, the rotating parts can be chosen with reduced dimensions and subjected to stresses which correspond only to speeds of rotation which are substantially less by half than those which would be necessary in the prior art to deliver the desired aerodynamic load.

Since the turbine wheels are thus slowed down, they are low loaded mechanically, something which is beneficial to the mass balance, to their mechanical feasibility, to their reliability and to their maintenance costs. Likewise for the turbine shafts, each of them sees only half of the engine torque. Consequently, they can be a priori two times less thick than a conventional turbine shaft. Additionally, owing to their small speed, they do not pose any problems with overall dynamics; the integration of these two shafts in the HP turbine bore is therefore facilitated. Moreover, this relative slowness of the shafts has also beneficial consequences with regard to the load of the bearings and therefore to their dimensioning.

It remains, however, to reverse the direction of rotation of one of the LP shafts in order to make it participate in the driving of the LP shaft 2. That is the function of a reversing module which consists of the bevel pinions 19 and 21 and of the reversing pinion 20.

The torque which results from the aerodynamic forces applied to the two second wheels 9b and 10b drives the second LP shaft 2b as in the case of a conventional engine with a single LP shaft, this taking place at the speed of rotation chosen for an optimum operation of the fan both with regard to its aerodynamic efficiency and to its noise level. As for the torque which results from the aerodynamic forces applied to the first wheels 9a and 10a, it drives the first LP shaft 2a, in the opposite direction to the shaft 2b, and at a speed imposed by the module for reversing the direction.

With reference to the configuration illustrated in the first embodiment, the first LP shaft 2a drives the first bevel pinion 19 via its splines, thereby likewise driving the reversing pinion 20 and finally the second bevel pinion 21; the speed of rotation obtained at the outlet of the second bevel pinion 21 is a function of the ratio of the dimensions of the bevel pinions but is in the opposite direction of the rotation of the pinion 20. Since the second bevel pinion 21 turns in the same direction as the LP turbine shaft 2b, it can for its part be connected by splines. There is thus obtained on the turbine shaft 2, at its connection with the fan, the sum of the torques transmitted, on the one hand, by the two second wheels 9b and 10b to the second shaft 2b and, on the other hand, by the two first wheels 9a and 10a to the first shaft 2a, which, however, turn in opposite directions.

Although, in thermodynamic terms, the performances obtained are equivalent to those of an engine with a reduction gear, the mechanical loads experienced by the pinions of the reversing module are a lot smaller than those experienced by a reduction gear, since:
  this module experiences only a fraction of the power of the engine,
  there may be a large number of pinions (typically between eight and twelve) distributed over the circumference of the reversing module, between which the power is distributed. The pinions of each module then experience only a even smaller fraction of the power that would be experienced by a reduction gear of the prior art.

The fact that the pinions of the reversing module face much smaller stresses benefits not only their reliability and their feasibility but also limits the power that they dissipate. In fact, the power to be dissipated in the speed reversing module will be much smaller than in the prior art on account of the fact that:

the module experiences only half the power of the engine; the stresses are therefore small, the speeds of rotation of the rotating parts are small (typically 2500 to 3500 rpm instead of 8 to 10,000), the pinions are situated in the enclosure of the bearing units of the LP compressor module. They are thus ventilated by the air for pressurizing this enclosure. Consequently, the problems of integrating the heat exchanger are greatly limited. They additionally benefit with regard to their lubrication from the supply devices already provided for the lubrication of the bearing units of the LP module.

Finally, in the prior art, the reduction gear is produced as the interface between two modules independent of the engine (namely the fan and the LP turbine), which each have their own behavior. In the present invention, the fan is rigidly connected to the turbine by the shaft 2b, which will secure them and will thus stiffen the assembly and therefore limit undesirable phenomena such as axial misalignments.

The invention has been described in the case of a twin-spool bypass engine with a fan. It is equally applicable to the case of any aeronautical engine, having a single or double flow, without a fan, the term fan then having to be understood as the first stage of the LP compressor.

Although the invention has been described in relation with a number of particular embodiments, it is quite clear that it is in no way limited thereto and that it comprises all the technical equivalents of the means described and also their combinations if they come within the scope of the invention.

The invention claimed is:

1. An aeronautical engine comprising:
a fan;
a low pressure compressor and a high pressure compressor; a combustion chamber;
a high pressure turbine and at least one low pressure turbine stage, said low pressure turbine stage comprising a first movable bladed wheel carried by a first end of a first low pressure turbine shaft and a second movable bladed wheel carried by a first end of a second low pressure turbine shaft;
and a reversing module including a first bevel pinion connected to a second end of the first low pressure turbine shaft, a second bevel pinion connected to a second end of the second low pressure turbine shaft, and a reversing bevel pinion cooperating with the first and second bevel pinions;
wherein a rotation direction of the second wheel is opposite of a rotation direction of the first wheel,
wherein the fan is driven both by said first wheel via the first low pressure turbine shaft and by said second wheel via the second low pressure turbine shaft and by said first shaft via the reversing module, wherein the first bevel pinion and the second bevel pinion are the same size, and the first low pressure turbine shaft and second low pressure turbine shafts turn in absolute value at the same speed of rotation, and wherein the reversing bevel pinion rotates about a fixed axle which is connected to a static structure of the engine.

2. The aeronautical engine as claimed in claim 1, wherein the reversing module is situated in the vicinity of the fan, below an inlet casing of the low pressure compressor.

3. The aeronautical engine as claimed in claim 1, wherein a fixed turbine nozzle is positioned upstream of the first movable bladed wheel of the low pressure turbine stage.

4. The aeronautical engine as claimed in claim 1, wherein blades of a turbine nozzle are oriented like blades of a turbine rotor and the blades of the first movable bladed wheel are oriented like vanes of a turbine stator.

5. The aeronautical engine as claimed in claim 3, wherein blades of said turbine nozzle are oriented like blades of a turbine rotor and the blades of the first movable bladed wheel are oriented like vanes of a turbine stator.

6. The aeronautical engine as claimed in claim 1, wherein blades of a turbine nozzle are oriented like vanes of a turbine stator and the blades of the second movable bladed wheel are oriented like blades of a turbine rotor.

7. The aeronautical engine as claimed in claim 3, wherein blades of said turbine nozzle are oriented like vanes of a turbine stator and the blades of the second movable bladed wheel are oriented like blades of a turbine rotor.

8. The aeronautical engine as claimed in claim 1, comprising a plurality of low pressure turbine stages, wherein the first bladed wheels for each low pressure turbine stage are connected mechanically to one another, and the second bladed wheels for each low pressure turbine stage are connected mechanically to one another.

9. The aeronautical engine as claimed in claim 1, wherein the first and second low pressure turbine shafts each carry a bearing unit between which a ball bearing is arranged.

10. The aeronautical engine as claimed in claim 1, in wherein the first and second low pressure turbine shafts each carry a bearing unit between which a roller bearing is arranged.

11. The aeronautical engine as claimed in claim 1, wherein the first bevel pinion is carried by splines of the first low pressure turbine shaft and by a bearing unit mounted on a ball bearing connected to the structure of the engine.

12. The aeronautical engine as claimed in claim 1, wherein the second bevel pinion is carried by splines of the second low pressure turbine shaft and by a bearing unit mounted on a roller bearing connected to the structure of the engine.

13. The aeronautical engine as claimed in claim 1, wherein the fixed axle supplies lubrication to the first and second pinions.

14. The aeronautical engine as claimed in claim 1, wherein the first and second bevel pinions and the reversing bevel pinion are provided in an enclosure of a bearing unit of the low pressure compressor.

* * * * *